United States Patent [19]

Salit

[11] 4,449,942
[45] May 22, 1984

[54] KIT FOR THE ASSEMBLY OF ELECTRICAL CIRCUITS

[76] Inventor: Yechiel Salit, 12 Alexander Yanai St., Tel-Aviv, Israel

[21] Appl. No.: 392,328

[22] Filed: Jun. 25, 1982

[30] Foreign Application Priority Data

Jul. 3, 1981 [IL] Israel .................................. 63231

[51] Int. Cl.³ .......................................... G09B 23/18
[52] U.S. Cl. ................................ 434/224; 339/17 C; 339/125 R
[58] Field of Search ..................... 434/224, 301, 379; 339/17 C, 125 R

[56] References Cited

U.S. PATENT DOCUMENTS

| | | | |
|---|---|---|---|
| 2,878,587 | 3/1959 | Jubenville | 434/224 |
| 3,018,568 | 1/1962 | Tischler | 434/224 |
| 3,062,991 | 11/1962 | Kaidan | 339/17 C X |
| 3,205,407 | 9/1965 | Thompson | 339/125 R X |

Primary Examiner—William H. Grieb
Attorney, Agent, or Firm—Ostrolenk, Faber, Gerb & Soffen

[57] ABSTRACT

A kit for the assembly of various electrical circuitry, particlarly for didactical purposes comprising a selection of electrical or electronics components. Each component is mounted on an insulated board having extentions of a conductive material to which the component's terminals are electrically connected. The boards are adapted to be interchangeably and releasably mounted on a base in the form of a prismatic block made of a rigid, electrical insulating material. Metallic sockets are installed within the blocks. Releasable fasteners, such as screws, are used for establishing electrical connection between each conductive extention and associated socket, and wire plugs are inserted into openings formed in the side surfaces of the block.

10 Claims, 22 Drawing Figures

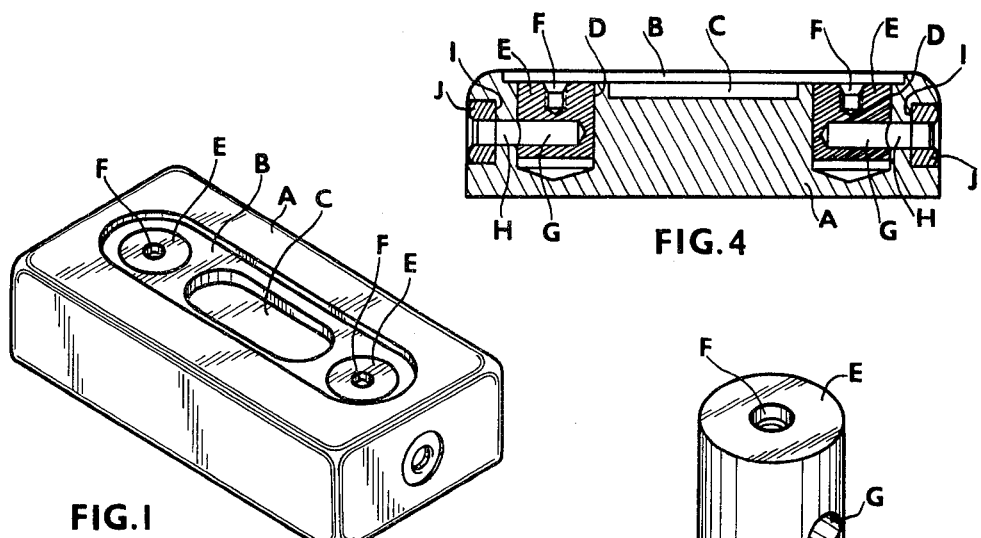
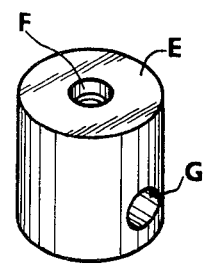
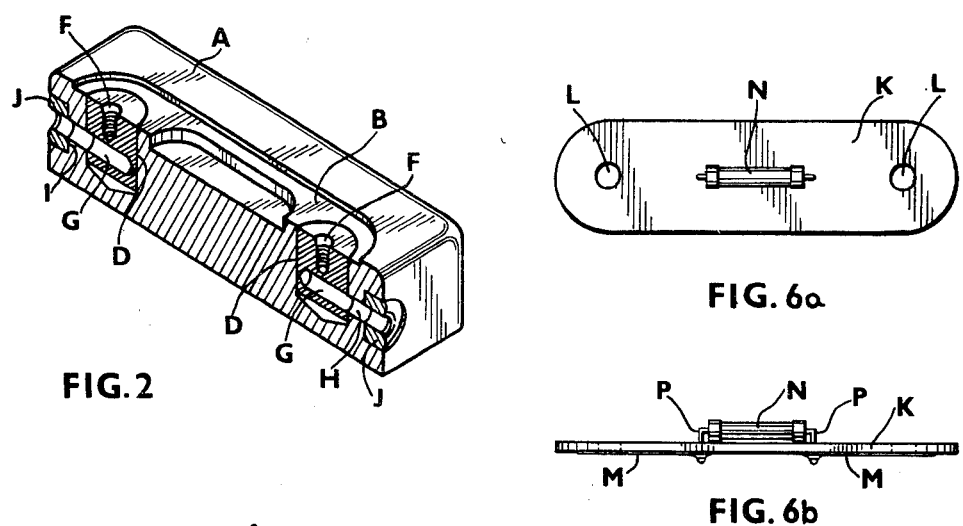
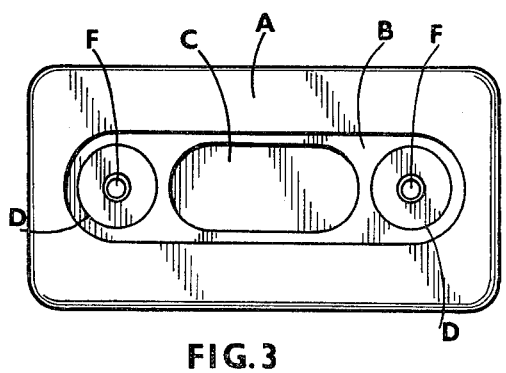
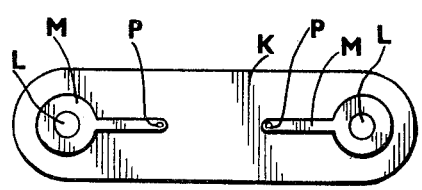

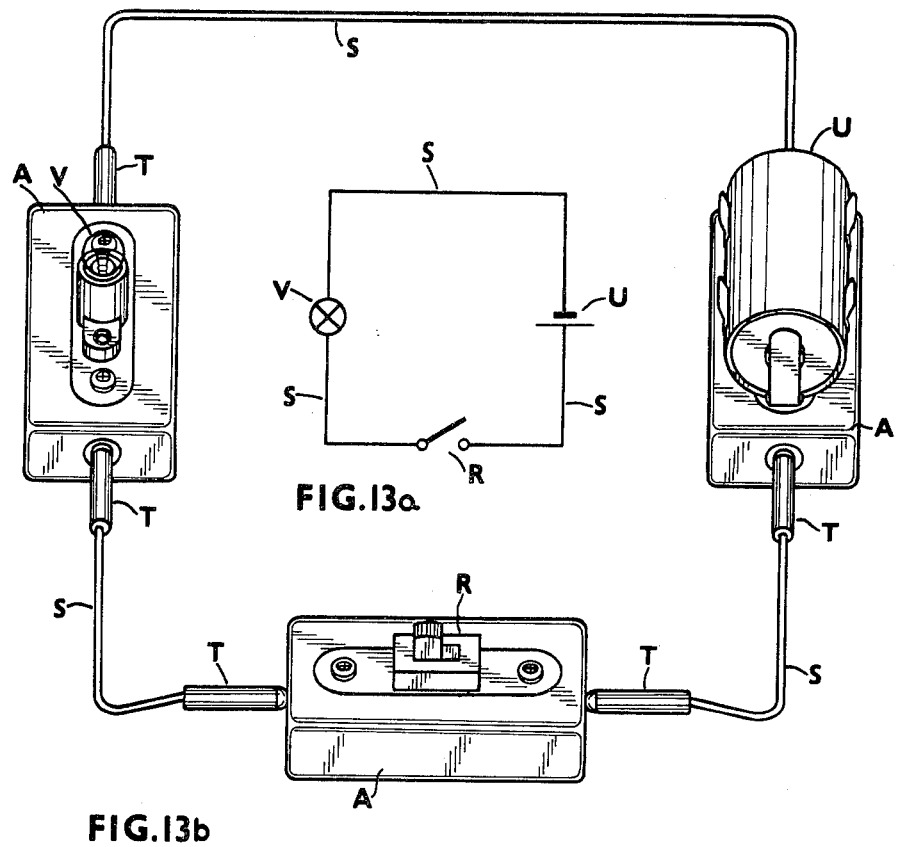
FIG.13a
FIG.13b
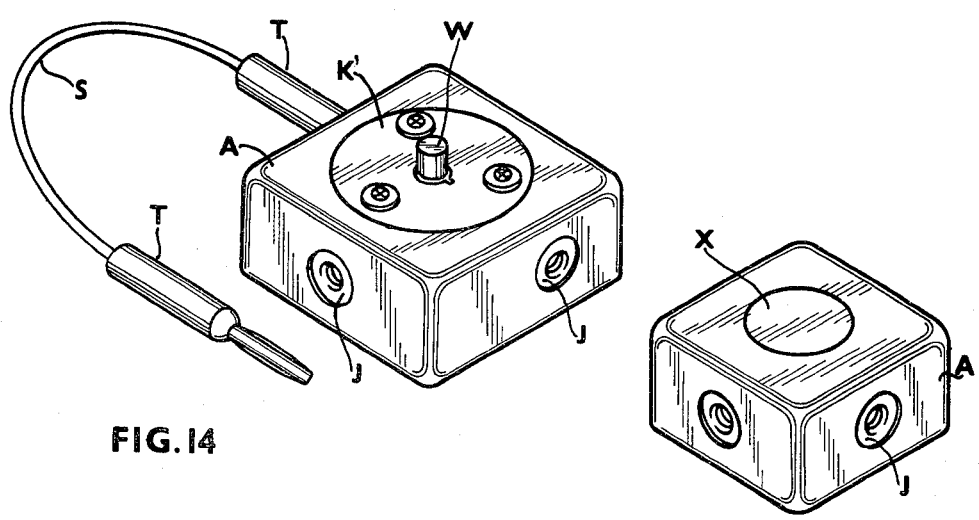
FIG.14
FIG.15

KIT FOR THE ASSEMBLY OF ELECTRICAL CIRCUITS

The present invention relates to kits for the assembling of electrical or electronic circuitry, particularly for didactical or instructional purposes, namely at schools or for electronics hobbyists.

There is known a large variety of electrical or electronic kits for the above uses, however, all these known assemblies are either of a primitive construction, usually comprising plug-in boards wherein clips and clamps are required for establishing electrical contact between the various components, or, where more sophisticated systems are concerned, they require higher skill and special equipment, such as lead solders, for building even the most simple circuit.

It is therefore the object of the present invention to devise a modular multi-purpose kit comprised of easy-to-handle components without the need for special equipment and tools.

It is a further object of the invention that such kit will, at any of its assembled-together states represent the built circuit in an as-close-as-possible resemblance to its schematic presentation as customary in electrical circuitry diagrams, i.e. in a two-dimensional plane.

Generally, the invention consists of a kit for the assembly of electrical circuitry, particularly for didactical purposes, comprising a selection of electrical or electronics components; each component being mounted on an insulated board having extentions of a conductive material to which the component's terminals are electrically connected; the boards being adapted to be interchangeably and releasably mounted on a base in the form of a prismatic block made of a rigid, electrical insulating material having a bottom, side and top surfaces; metallic sockets installed within the blocks; means for releasably fastening the boards to the blocks, thereby establishing electrical connection between a conductive extention thereof and a socket; and openings formed in side surfaces of the block and in each socket for the insertion of wire plugs thereinto.

The boards are preferably made out of printed circuit panels and the fasteners are screws receivable in tapped bores formed in sockets inserted into blind bores formed in the block.

These and further constructional features and advantages of the invention will become more clearly understood in the light of the ensuing description of two preferred embodiments of the invention, given by way of example only, with reference to the accompanying drawings, wherein:

FIG. 1 is a three-dimensional view of a baseblock of the kit according to one embodiment of the invention;

FIG. 2 is a longitudinal cross-sectional view of the block of FIG. 1;

FIG. 3 is a top view of the block of FIG. 1;

FIG. 4 is a cross-sectional view of the block of FIG. 3;

FIG. 5 is a three-deminsional view of a socket incorporated in the block of FIGS. 1-4;

Figure 7:
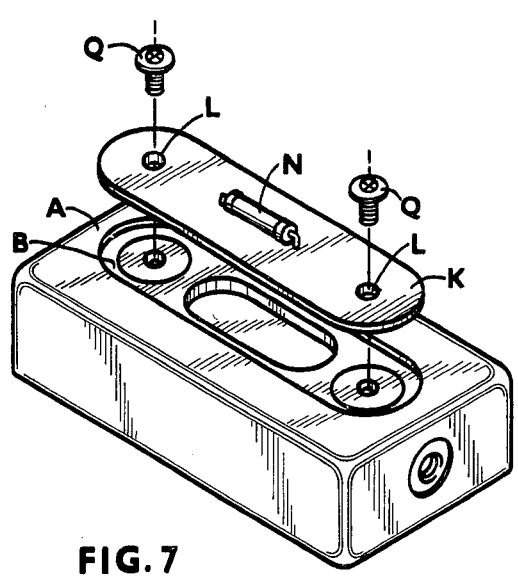
Figure 10:
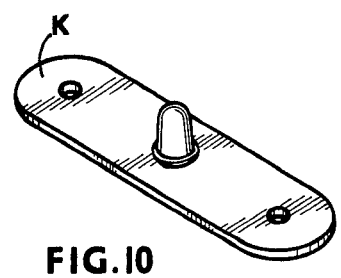
Figure 11:
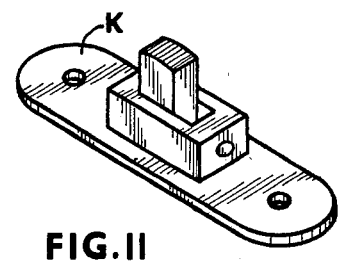
Figure 8:
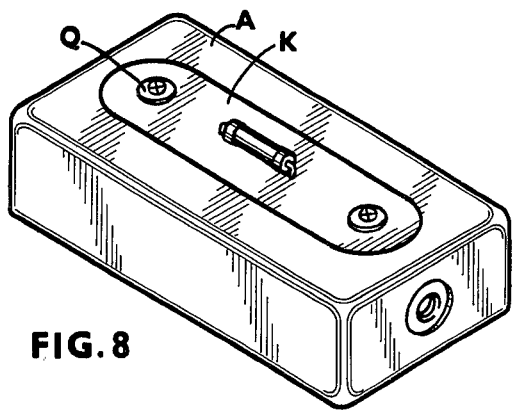
Figure 12:
Figure 9:
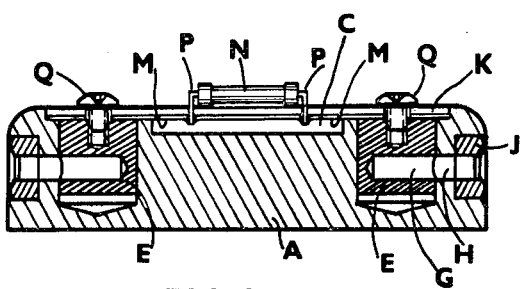
Figure 16:
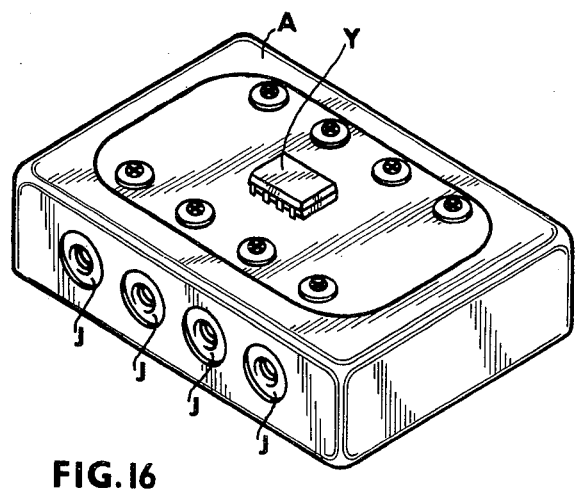

FIGS. 6a, 6b, and 6c are, respectively, top, side and bottom views of a printed circuit board with a resistor mounted thereon;

FIG. 7 is a three-dimensional view of a block with the resistor board before assembling same to the block;

FIG. 8 is a block assembled with the resistor board of FIG. 7;

FIG. 9 is a cross-sectional view of FIG. 8;

FIG. 10 shows a board with a light emitting diode mounted thereon;

FIG. 11 shows a board with a switch mounted thereon;

FIG. 12 shows a wire with plugs for the assembly of blocks into an electrical circuit;

FIGS. 13a and 13b are, respectively, a schematic diagram and a physical form of a simple circuit built from the kit according to the present invention;

FIG. 14 shows a complete mounting of a transistor on a block;

FIG. 15 shows a block serving a three-or four-points junction;

FIG. 16 shows an integrated circuit component mounted on a block.

Figure 17:
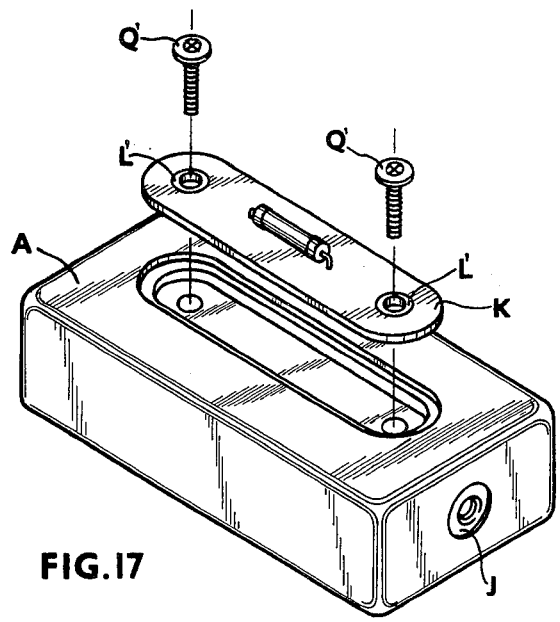
Figure 18:
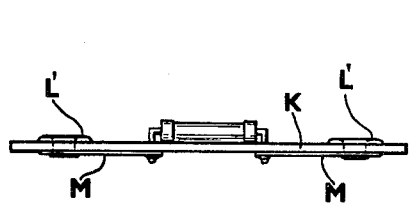

FIG. 17 shows a modified form of block and resistor board assembly;

FIG. 18 is a side-view of the resistor board of FIG. 17; and

Figure 19:
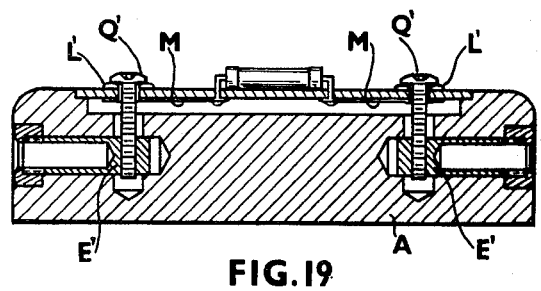

FIG. 19 is a cross-section of the assembled block and board of FIGS. 17 and 18.

Any circuit built of the kit according to the present invention will be composed of any suitable number of "building-bricks" constituted by the prismatic blocks marked A illustrated in the drawings. Hence, in FIGS. 1-4, the blocks A are made of a rigid, electrically insulating material, preferably wood, and being more-or-less of a size of a matchbox for the easy handling therof even by young students. At the top surface of the block A there is formed a recess B of a generally rectangular (or other) shape, and a second, smaller recess C, for purposes to be described later.

Snugly fitted in blind bores D there are two cylindrical metallic sockets E (see FIG. 5) each having a tapped, axial bore F and a radial, blind bore G.

Bores G are in alignment with bores H having a sunk shoulder I forming a seat for a coloured, polarity identification plastic washer J fitted into the opposite, short side-walls of the block A.

This completes the basic "building-brick" of the kit.

As shown in FIGS. 6a-6c, there is provided a board or small plate K of an electrically insulated material, which board is preferably punched-out of standard printed-circuit board or panel and conforms the shape and size of the recess B. Board K has two holes L at its sides, (which may be encircled by metallic eyelets denoted L' in FIGS. 17-19).

As best seen in FIG. 6c, a pair of conductive strips M are formed (by etching if a printed circuit panel is used) at the bottom side of the board, preferably around the holes L with an extension towards the center of the board. A resistor N is mounted on the other, top-side of the board K, with legs P penetrating the board and soldered each to one of the conductive strips M.

The resistor printed-circuit board K is adapted to be assembled or affixed onto the block A (see FIG. 7), fitting into the cavity or recess B, by a pair of screws Q, as shown in FIGS. 8 and 9. Cavity C thus leaves room for the soldered legs P, while the board K is neatly seated within the cavity B.

An electrical connection is thus formed between the resistor legs P, through strips M (and eyelets L'), to the metallic sockets E.

Obviously, such mounting of the board K on a block A is a most simple operation, readily performed using a screwdriver, even by small children. Alternatively, any other suitable, quick and simple fastening means may be employed, such as friction plugs.

Further according to the present invention, there are provided in a similar manner plates or boards K carrying various other electrical or electronic components such as a light emitting diode (FIG. 10) or a switch as shown in FIG. 11.

Bendable wires S, having plugs T (FIG. 12) will be supplied with the kit and used for connecting the blocks A one to another, as required for building any specific circuit, following the diagrammatic representation thereof.

A simple example of use of the invention is illustrated in FIGS. 13a and 13b: A power source in the form of a battery U is connected via the switch R to a bulb socket V by the wiring S. The resemblance of the physical circuit, built-up of the components according to the present invention, to the schematic diagram of the circuit shown in FIG. 13a is stiking. This, together with the most simple handling and assembling procedures required for building the circuit, emphasizes the advantage of the present invention from all aspects.

FIG. 14 illustrates the assembly of a three-legs component, such as transistor W, on a block A comprising three metallic sockets (not shown) underside a circular board K', electrically connected by the printed circuit strips (not shown) to the legs of the transistor W. The blocks A for this purpose will comprise three plug-in washers J for the three plugs T of the wires S.

FIG. 15 shows a similar block A with a central single metallic socket X serving a junction for three or four wires, where connections in parallel are required.

Lastly, there is exemplified in FIG. 16 the mounting of an I.C. (Integrated Circuit) component Y with eight legs to a base block A in a similar manner as with respect to the more simple components.

It has thus been established that the kit devised according to the present invention paves the way to a great many possibilities, from the most simple wirings to more complicated circuits, using a limited number of the more-expensive blocks A and a larger stock of the less-expensive electronic components each associated with a printed circuit board, such boards being readily exchangeably mountable on the blocks.

For assembling a specific circuit, all that is needed is to tighten a number of screws and plug-in a number of wires, and the circuit is completed. It would also be noted that the screw heads constitute convenient testing points of the circuit.

It will be readily understood by those skilled in the art that the invention as heretofore exemplified may be executed in other, modified manners, especially regarding the geometrical shapes of the blocks and printed circuit boards, and the method of mounting the boards on the blocks. Thus, in FIGS. 17-19, a modified embodiment of the invention is illustrated employing differently designed metallic socket members E' (FIG. 19) electrically as-well-as mechanically connected to the printed-circuit board K through and by the screws Q'. To ensure good connection, metal eyelet members L' should be provided, crimped around the holes L in contact with the circular portion of the conductive strips M (see FIG. 6c).

It should therefore be emphasized that the invention is not delimited by these examples and be broadly construed to include any other obvious variations and modifications without departing from the spirit and scope thereof, as defined in the appended claims.

What is claimed is:

1. A kit for the assembly of electrical circuitry, particularly for didactical purposes, comprising:
   a selection of electrical or electronics components;
   each component being mounted on an insulated board having extentions of a conductive material to which the component's terminals are electrically connected;
   the boards being adapted to be interchangeably and releasably mounted on a base in the form of a prismatic block made of a rigid, electrical insulating material having a bottom, side and top surfaces;
   metallic sockets installed within the blocks;
   means for releasably fastening the boards to the blocks, thereby establishing electrical connection between a conductive extention thereof and a socket; and
   openings formed in side surfaces of the block and in each socket for the insertion of wire plugs thereinto.

2. The kit as claimed in claim 1 wherein the boards are made from a printed-circuit panel whereby the conductive extentions are strips prepared by etching.

3. The kit as claimed in claim 2 wherein the blocks have a recessed top surface for receiving the boards.

4. The kit as claimed in claim 3 wherein said fastenering means are screws received through holes in the boards into tapped bores formed in said sockets.

5. The kit as claimed in claim 4 wherein the conductive extentions are in abutting contact with the sockets.

6. The kit as claimed in claim 4 wherein the holes are encircled by crimped metal eyelets, the eyelets being in electrical contacts with the conductive extentions.

7. The kit as claimed in claim 4 wherein said sockets are cylindrical, inserted into blind bores formed in the block.

8. The kit as claimed in claim 1 wherein said components are multiple-terminal components, such as resistors, transistors and integrated circuits.

9. The kit as claimed in claim 1 further including a junction block comprising a single socket with four of said openings.

10. The kit as claimed in claim 1 wherein said openings are provided with a coloured polarity indicating washer.

* * * * *